(12) United States Patent
Eubanks et al.

(10) Patent No.: US 8,166,740 B2
(45) Date of Patent: May 1, 2012

(54) IMPELLER CONDITIONER ROTOR EQUIPPED WITH CURVED TINES

(75) Inventors: Jason Chad Eubanks, Hedrick, IA (US); Henry Dennis Anstey, Ottumwa, IA (US); Allan Wesley Rosenbalm, Blakesburg, IA (US)

(73) Assignee: Deere & Company, Moline, IL (US)

( * ) Notice: Subject to any disclaimer, the term of this patent is extended or adjusted under 35 U.S.C. 154(b) by 1791 days.

(21) Appl. No.: 11/061,966

(22) Filed: Feb. 21, 2005

(65) Prior Publication Data

US 2006/0185338 A1 Aug. 24, 2006

(51) Int. Cl.
*A01D 34/42* (2006.01)
(52) U.S. Cl. .................. 56/504; 56/14.5; 56/16.4 R
(58) Field of Classification Search .............. 56/16.4 R, 56/228, 364, 6, 16.6, 153, 157, 500, 249, 56/294, 14.5, 504, 12.7; 460/111, 112, 71, 460/73, 74; 198/717, 725, 726
See application file for complete search history.

(56) References Cited

U.S. PATENT DOCUMENTS

| | | | | |
|---|---|---|---|---|
| 2,656,670 A | * | 10/1953 | Hintz | 56/364 |
| 2,827,745 A | * | 3/1958 | Taylor | 56/1 |
| 3,397,572 A | * | 8/1968 | Stolz et al. | 73/856 |
| 4,021,995 A | * | 5/1977 | Hill | 56/1 |
| 4,077,192 A | * | 3/1978 | Klinner et al. | 56/16.4 R |
| 4,182,099 A | | 1/1980 | Davis et al. | |
| 4,233,803 A | | 11/1980 | Davis et al. | |
| 4,565,057 A | * | 1/1986 | Vissers et al. | 56/364 |
| 4,947,626 A | * | 8/1990 | Maier | 56/364 |
| 6,692,351 B2 | * | 2/2004 | Johnson et al. | 460/112 |

* cited by examiner

*Primary Examiner* — Alicia Torres

(57) ABSTRACT

A crop conditioner is equipped with an impeller including a rotor to which a plurality of conditioner tines are respectively pivotally mounted at one of their ends. The tines are contoured so that they release crop at an appropriate location for the crop to engage the forming shields and thus become part of a well-defined windrow.

4 Claims, 3 Drawing Sheets

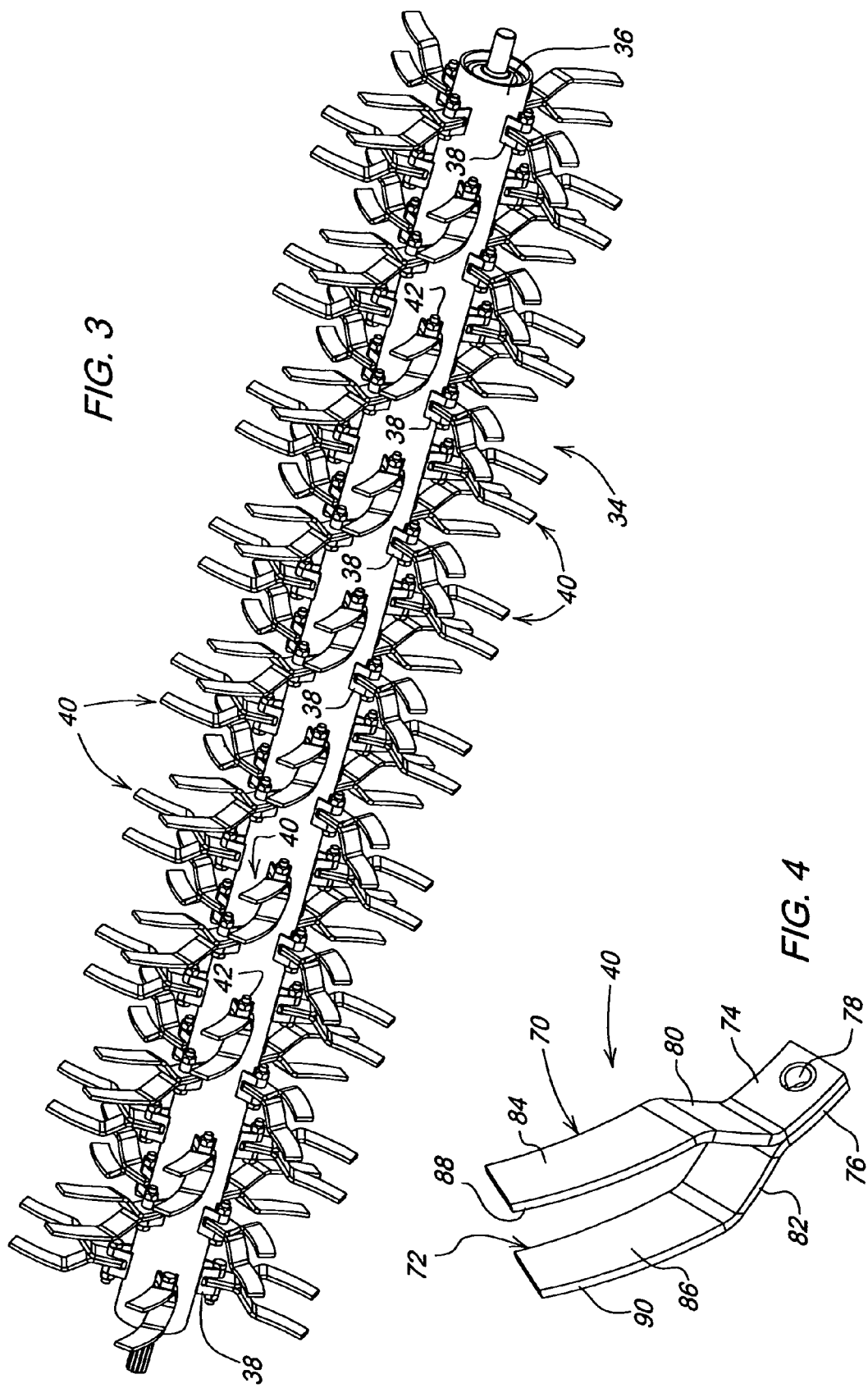

IMPELLER CONDITIONER ROTOR EQUIPPED WITH CURVED TINES

FIELD OF THE INVENTION

The present invention relates to impeller conditioners for use in mower-conditioners for conditioning mowed crops for aiding in dry-down, and more particularly relates to tines for the rotors of such impeller conditioners

BACKGROUND OF THE INVENTION

Typically, an impeller conditioner is provided with an impeller mounted for rotation about a horizontal transverse axis, and with a hood which extends arcuately, from front to rear, about the impeller. The impeller includes a rotor defined by a central cylindrical core to which a plurality of tines are pivotally attached at various locations along, and about, the circumference of the rotor. These tines are mounted so that, as viewed from an end of the rotor, they extend generally radially from the axis of rotation of the rotor when the impeller is being driven, with the tines then being subjected to centrifugal force. U.S. Pat. Nos. 4,182,099 and 4,233,803 disclose impellers of this type.

When conditioning crop with an impeller of the type discussed above, some crop does not release correctly for being guided by the shields for forming the crop windrow, but rather is carried over where it is released directly to the ground. The carried over crop that is deposited outside of the normal bounds of a windrow that would normally be formed by the forming shields results in non-uniform looking windrows and causes the crop to dry at different rates.

The solution to non-uniform windrows formed because of crop being carried over by the conditioner tines is the focus of this invention.

SUMMARY OF THE INVENTION

According to the present invention, there is provided an improved impeller for use in a crop conditioner equipped with an impeller conditioner.

An object of the invention is to provide such an impeller conditioner having a rotor equipped with tines shaped for releasing crop at a desired location so no crop carry over occurs, or is significantly reduced.

The above object is achieved by providing an impeller rotor with a plurality of tines which are each curved outwardly from the axis or rotation of the rotor such that, as considered in the direction of rotation of the rotor during operation, outer ends of the tines trail their respective inner ends.

BRIEF DESCRIPTION OF THE DRAWINGS

FIG. 3 is a left front perspective view of the impeller.

FIG. 4 is a perspective view of one of the tines that are mounted to the impeller rotor.

DESCRIPTION OF THE PREFERRED EMBODIMENT

Figure 1:
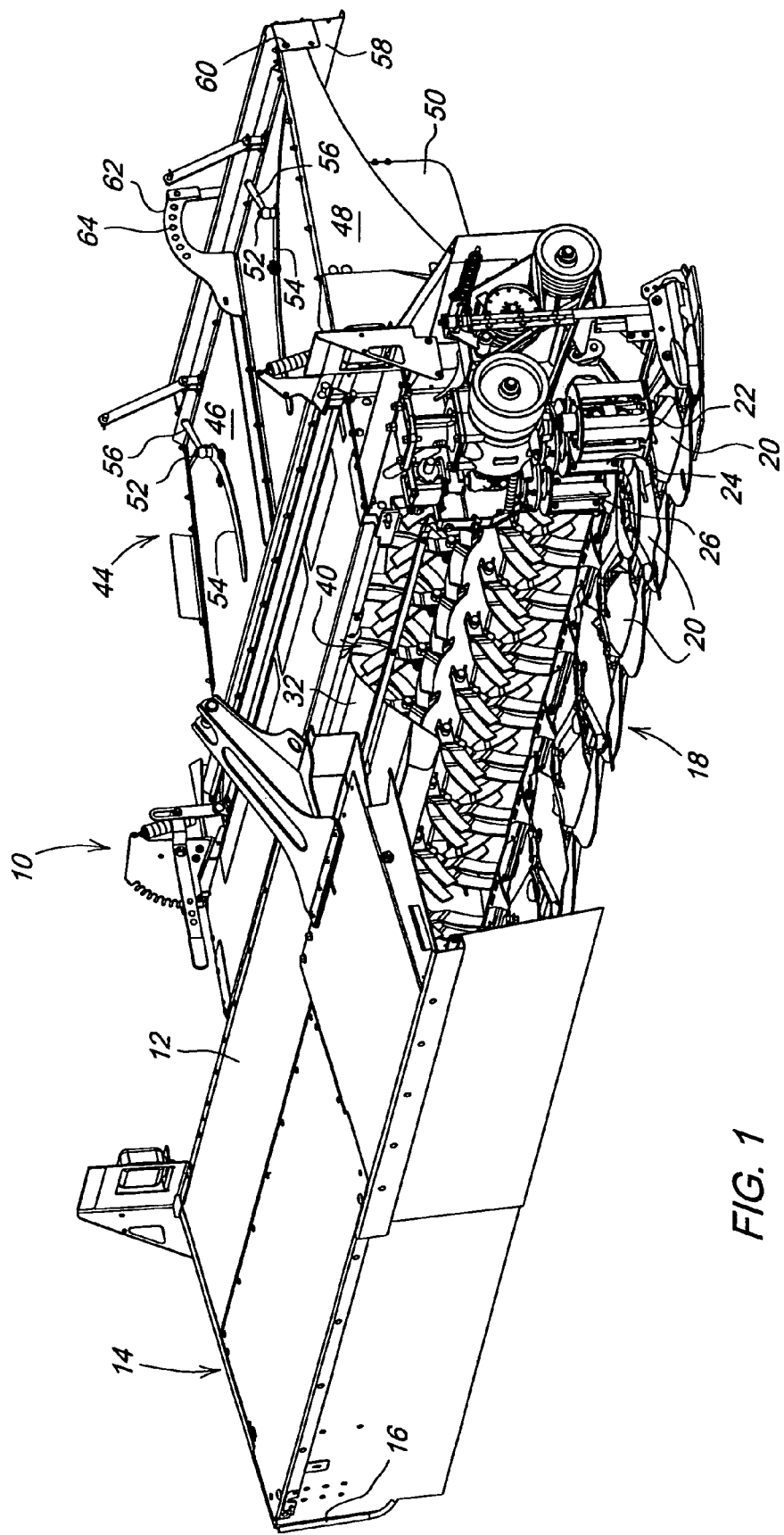
FIG. 1 is a left front perspective view of a mower-conditioner header, with portions removed, so as to reveal a left end portion of an impeller conditioner including an impeller rotor equipped with tines shaped in accordance with the present invention.
Figure 2:
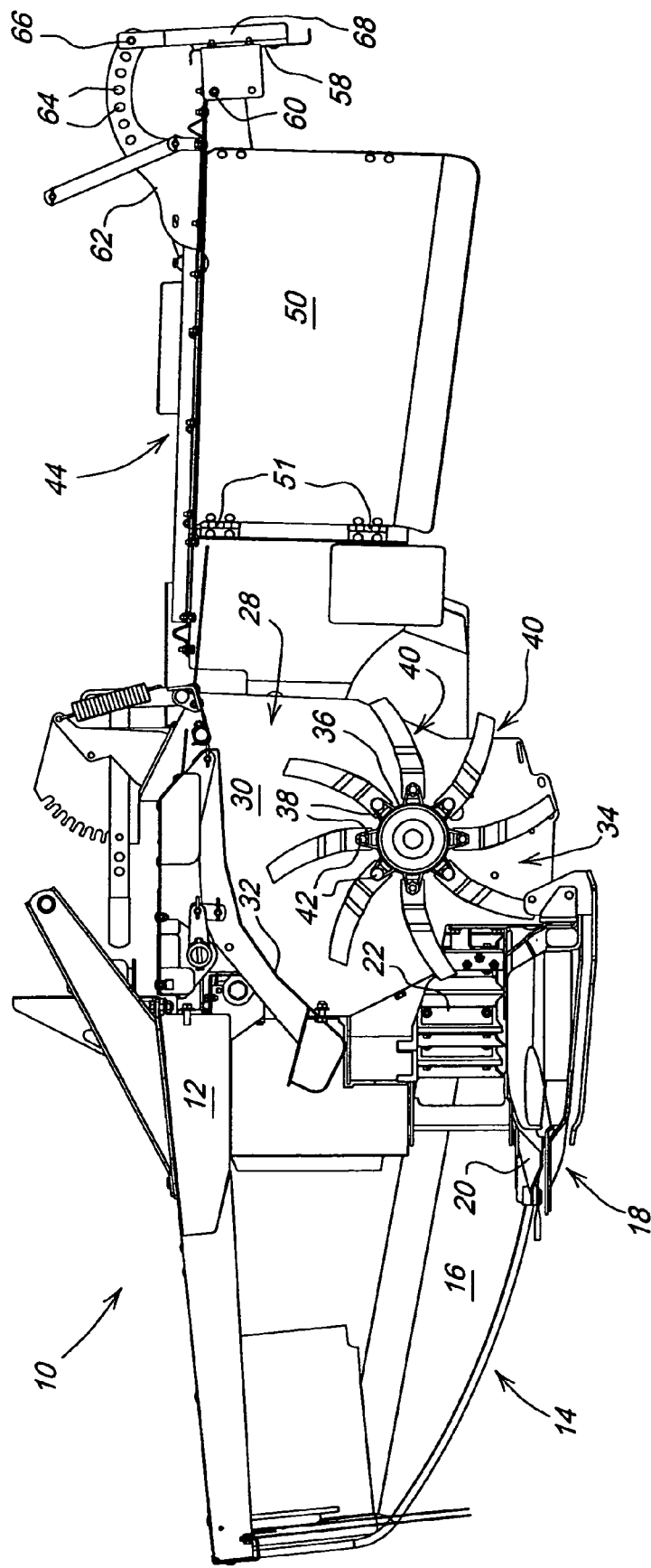
FIG. 2 is a right side view of the mower-conditioner header shown in FIG. 1, with portions broken away, revealing a left end of the impeller.

Referring now to FIGS. 1 and 2, there is shown a mower-conditioner header 10, which would normally be suspended from a carrying frame, not shown. The header 10 includes a frame 12 supporting a housing 14 having opposite side walls 16.

A rotary cutter bar 18 extends transversely between the side walls 16 and includes a plurality of rotary cutting units 20 mounted along the length of the cutter bar 18 in side-by-side relationship to each other. Located for rotation with outer end ones of the cutting units 20 is an outer crop converging drum 22. Mounted inwardly, and to the rear, of each converging drum 22, is an intermediate converging drum 24, and similarly mounted inwardly, and to the rear, of each drum 24 is an inner converging drum 26.

The converging drums 22-26, cooperate with the cutting units 20 to deliver cut crop to a discharge opening leading to an impeller housing 28 including opposite side walls 30 and an arched rotor hood 32. Extending between, and mounted for rotation in, the side walls 30 is an impeller 34 including a central rotor 36 defined by a cylindrical tube carrying a plurality of tine clips 38 to which a plurality of impeller tines 40 are respectively pivotally mounted by pivot assemblies including transverse pins 42. The impeller hood 32 is spaced approximately concentric to a segment of the impeller extending between ten and one o'clock positions of a circular path described by the outer periphery of the tines 40 during rotation of the impeller 34.

Joined to and extending to the rear from the impeller housing 28 is a forming shield arrangement 44 including a horizontal top wall 46 and opposite, rearwardly converging side walls 48. Located inwardly of each of the side walls 48 is a generally rectangular, vertical crop deflecting panel 50 having a forward edge hinged, as at 51 (FIG. 2), for establishing a vertical pivot axis about which the deflecting panel 50 may be pivoted. A threaded pin 52 (FIG. 1) is secured to, and projects upwardly from a top edge of, each panel 50 and is received for moving along a slot 54 formed in the top wall 46 at a radius about the pivot axis defined by the hinge 51. A threaded handle 56 is received on each threaded pin 52 for releasably securing the panel 50 in a desired location. For deflecting crop to one side or the other of a vertical plane extending in the direction of operation of the header 10 and passing through a longitudinal center location of the header 10, the panels are disposed parallel to each other and inclined one way or the other relative to the vertical plane. Crop may be converged by the panels 50 by disposing the panels 50 so that they converge rearwardly. A rear panel 58 is mounted, as by transverse pins 60, to rear ends of the side walls 48 for pivoting vertically about a horizontal transverse axis defined by the pins 60. An arcuate fore-and-aft extending bracket 62 is provided at a central, rear location of the top wall 46 and contains a plurality of adjustment holes 64 for selectively receiving a coupling pin 66 for securing a connecting bracket 68 of the panel 58 to a desired adjustment hole 64 so that the rear panel is positioned in a desired position for deflecting crop toward the ground.

Referring now also to FIG. 3, it can be seen that the tines 40 are disposed at seven equal angularly spaced locations about the longitudinal axis of the cylindrical rotor 36 of the impeller 34. Further, it can be seen that the tines 40 are located in longitudinal rows with the tines in each row being offset axially from the tines of an adjacent row.

Referring now also to FIG. 4, it can be seen that each tine 40 is an elongated forked member here shown as having two parallel limbs so as to be Y-shaped, however other numbers of limbs would be conceivable. As disclosed, the tine 40 includes separate flat strap elements 70 and 72, joined together, as by welding, at respective inner end sections 74 and 76 which are placed flat against each other and are provided with aligned apertures that define a mounting hole 78. Respectively joined to the inner end sections 74 and 76 are intermediate sections 80 and 82 which diverge outwardly from each other and are joined to parallel outer end sections 84 and 86. As viewed from the side in FIG. 2, it can be seen that each tine 40 has a curved geometry. As considered relative to a forward direction of rotation of the impeller 34 during conditioning operation (clockwise as viewed in FIG. 2), the curvature of the tines 40 result in the inner end sections 74 and 76 leading the associated outer end sections 84 and 86. Thus, the inner end sections 74 and 76, and the outer end sections 84 and 86 of the strap elements 70 and 72 define smooth leading edges 88 and 90 that extend between inner and outer ends of the tines 40.

As stated above, in operation the conditioner impeller 34 rotates clockwise, as viewed in FIG. 2, at a speed at which centrifugal force acting on the tines 40 causes them to project radially outwardly from the rotor 36. As cut crop is delivered to the impeller 34 by the cutting units 20 acting together with the sets of converging drums 22, 24 and 26 at the opposite ends of the cutter bar 18, the leading edges 88 and 90 of the strap elements 70 and 72 of each tine 40 engages and carries the crop upwardly and then rearwardly. The trailing aspect of the curved leading edges 88 and 90, as considered in the direction of rotation, results in the crop being released from a given impeller tine 40 by the time that the tine reaches the two o'clock position. The released crop is propelled rearwardly against one or more components of the forming shield arrangement 44 and is directed to the ground where it forms a windrow of substantially uniform thickness having a consistent drying characteristic throughout.

It is to be noted that while the crop-releasing characteristic of the tines 40 is particularly useful in the environment of a mower-conditioner, as illustrated in the drawings, such a characteristic would have benefit in any environment where the impeller 34 is being used as a conveyor for conveying crop to a further processing device.

Having described the preferred embodiment, it will become apparent that various modifications can be made without departing from the scope of the invention as defined in the accompanying claims.

The invention claimed is:

1. A tine for use with an impeller of a crop conveyor, comprising: at least two elongate members each having a first end adapted for being pivotally mounted to an impeller rotor, and an opposite second end, each elongate member having respective first sections joined together to define said first end, and having respective second sections offset transversely relative to said first sections so as to be parallel to said first sections; and said tine, as viewed in side view, including a substantially smooth curved leading edge which extends away from said first end in a trailing direction relative to a direction of rotation of said rotor when said tine is in operation for conveying crop.

2. The tine, as defined in claim 1, wherein said at least two elongate elements are shaped so as to be mirror images of each other.

3. The tine, as defined in claim 2, wherein said at least two elongate elements define a Y-shape.

4. The tine, as defined in claim 2, wherein said at least two elongate elements are straps.

* * * * *